United States Patent [19]

Perkins

[11] Patent Number: 4,473,816
[45] Date of Patent: Sep. 25, 1984

[54] COMMUNICATIONS SIGNAL BYPASS AROUND POWER LINE TRANSFORMER

[75] Inventor: William C. Perkins, Sachse, Tex.
[73] Assignee: Rockwell International Corporation, El Segundo, Calif.
[21] Appl. No.: 367,845
[22] Filed: Apr. 13, 1982
[51] Int. Cl.³ .......................................... H04M 11/04
[52] U.S. Cl. .............................. 340/310 R; 179/2.51; 307/3; 323/361
[58] Field of Search ........ 340/310 A, 310 R, 310 CP; 307/3, 140; 179/2.51, 170 H; 323/361; 336/5

[56] References Cited
FOREIGN PATENT DOCUMENTS
505858 8/1930 Fed. Rep. of Germany .
557114 4/1923 France .

Primary Examiner—James J. Groody
Assistant Examiner—Michael F. Heim
Attorney, Agent, or Firm—V. Lawrence Sewell; Howard R. Greenberg; H. Fredrick Hamann

[57] ABSTRACT

A circuit for bi-directionally bypassing a delta-wye transformer with a balanced phase-to-neutral power line communications signal, using passive components. The circuit includes a set of three capacitors connected in a wye configuration, each having one side connected to one of the three phase power lines on the delta side of the transformer. The circuit further includes a network connected from the node of the wye configuration of capacitors to the neutral conductor or conductors associated with the power lines on the two sides of the delta-wye transformer. The network includes a single phase transformer, as well as a capacitance connected from the secondary of this transformer to the node of the wye of the delta-wye transformer. The network further includes an inductive reactor connected from the neutral on the wye side of the delta-wye transformer to the node of the wye transformer. Component values of the network are selected so that the network is resonant from the three phase lines on the delta side of the transformer to the node on the wye side of the delta-wye transformer. Further, by selection of the voltage ratio of the single phase transformer, the voltage transformation ratio of the communications signal from the delta side to the wye side is made the same as the corresponding power voltage ratio of the delta-wye transformer.

6 Claims, 1 Drawing Figure

COMMUNICATIONS SIGNAL BYPASS AROUND POWER LINE TRANSFORMER

BACKGROUND OF THE INFORMATION

This invention reltes to a circuit providing a bypass around a delta-wye transformer in both directions for a balanced phase-to-neutral power line communications signal, while also providing a signal voltage ratio equivalent to the power line voltage ratio of the transformer. The bypass circuit utilizes passive components and is of a design which lends itself particularly to power line communication systems employing carrier frequencies in the 3–10 KHz range.

A balanced phase-to-neutral power line communications system is designed to provide the same signal voltage with respect to neutral on each of the conductors of a three phase line. Such a signal, balanced in each of the three phase conductors, does not significantly couple through a delta-wye transformer. This is because there is no connection to neutral on the delta side of the transformer, and the phase-to-phase signal voltage in the delta windings is designed to be zero. Therefore, in order to transmit the communications signal in a line containing, for example, a delta-wye distribution feeder step-down transformer, a bypass around the transformer must be provided for the signal.

Because it is desirable to be able to transmit the communication signal in either direction along the three phase lines which include the transformer, it is important that the bypass be bidirectional.

On either side of a distribution feeder transformer, there can be customer distribution transformers which provide, for example, a two-line voltage of 120 volts. Obviously, a customer distribution transformer providing 120 volts and located on the higher voltage side of a delta-wye feeder transformer must have a different voltage ratio than a customer distribution transformer providing 120 volts on the lower voltage side of the delta-wye transformer. It is desirable that the communications signals on the two 120-volt customer lines be in the same voltage range. Therefore, it is an advantage if the bypass around the delta-wye transformer provides the same voltage ratio for the communications signal as the delta-wye transformer provides to the power voltage.

SUMMARY OF THE INVENTION

The present invention provides a circuit of passive components for bypassing a delta-wye transformer in both directions for a power line communications signal which is a balanced phase-to-neutral signal on both sides of the transformer. The circuit includes three equal capacitors each having one side connected at a node to form a wye configuration, and each having the other side connected to a different phase conductor of the power line on the delta side of the transformer. A single phase transformer has its primary winding connected between the node of the wye configuration of capacitors and the neutral conductor of the power line on the delta side. One terminal of the secondary of the single phase transformer is connected to the neutral of the power line on the wye side. Another capacitor with capacitance C2 is connected from the node of the wye windings of the delta-wye transformer to the other terminal of the secondary winding of the single phase transformer. Further, an inductive reactor with inductance L is connected between the node of the wye windings of the delta-wye transformer and the neutral of the power line on the wye side.

In a preferred embodiment, the series combination including the inductance L, capacitance C2, the self inductance of the single phase transformer, and the capacitance of the wye configured capacitors considered in parallel is made resonant at the carrier frequency of the communications signal. This reduces the coupling impedance of the bypass circuit and maximizes the communication signal level in both directions of transmission.

Further in a preferred embodiment, the voltage transformation ratio of the bypass circuit, determined by the primary-to-secondary voltage ratio of the single phase transformer, is made equal to the primary- to-secondary voltage ratio of the delta-wye transformer.

German Pat. No. 505,858 and a French Pat. No. 557,114, both to Joseph Bethenod show a bypass circuit for a delta-wye transformer employing three wye-connected capacitors, each connected to one of the three phase lines on the delta side. A single phase transformer has the primary side connected between the node of the wye configured capacitors and ground, and has the secondary side connected between ground and the node of the wye side of the power transformer. Further, an inductive reactor and a capacitor are connected in a parallel circuit between the node of the wye windings of the power transformer and ground, the parallel circuit being made resonant at the communication signal carrier frequency.

By contrast to the arrangement of Bethenod, in the present invention there is not a parallel resonant circuit between the node of the wye windings of the power transformer and neutral. Instead, the present invention teaches using the single phase transformer to provide the same voltage transformation for the bypass circuit as for the delta-wye transformer, then using the wye-configured capacitors and an additional capacitance in series with the secondary of the single phase transformer to provide a series resonant condition at the communications signal carrier frequency. As stated above, the present teaching provides the advantage of reducing the coupling impedance of the circuit and maximizing the communications signal level in both directions of transmission.

Another bypass circuit is described in another patent application by the present inventor, entitled "Power Line Communications Bypass Around Delta-Wye Transformer". In that application, inductors and capacitors are used in a series resonant network, but there is no transformer. It is a teaching of the present invention, that the use of a transformer permits selection of a voltage transformation ratio for the bypass circuit more nearly independent of the selection of series resonance parameters. As a result, the single phase transformer can be selected to reduce effective series coupling reactance and attendant signal losses.

DESCRIPTION OF PREFERRED EMBODIMENT

Figure 1:
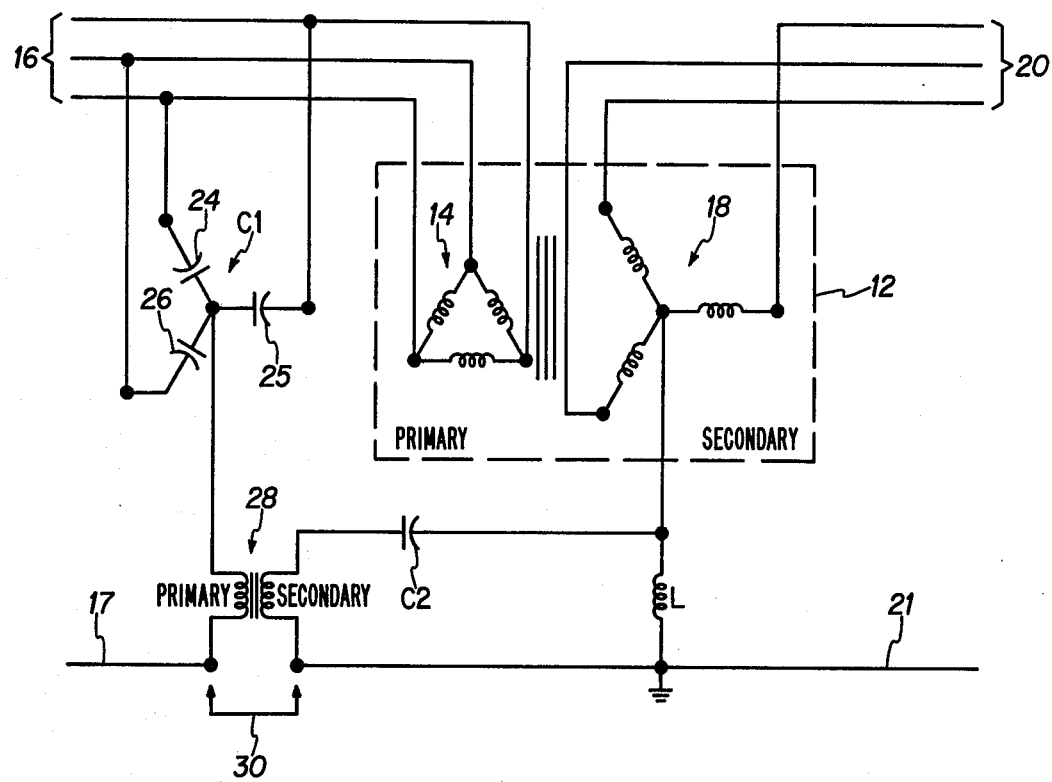
FIG. 1 is a schematic diagram of a bypass circuit according to the invention, shown bypassing a delta-wye transformer.

FIG. 1 shows a bypass circuit according to the invention, as applied to a delta-wye transformer 12. The primary delta windings 14 of the transformer are connected to three-phase lines 16. The secondary wye windings 18 of the transformer are connected to three-phase lines 20. There are neutral conductors 17 and 21 on the primary and secondary sides of transformer 12, respectively. The communication signal for which the bypass is conceived is a balanced phase-to-neutral signal. That is, the signal voltage with respect to neutral 17 is designed to be the same on each of the lines 16. Likewise, the signal voltage with respect to the neutral 21 on each of the lines 20 is designed to be the same.

Insofar as power is concerned, the delta windings 14 form the primary side of the transformer 12. By contrast, the communication signal is to be transmitted not only from lines 16 to lines 20, but also in the direction from lines 20 to lines 16. The bypass of the invention is intended to be particularly useful with communication signals having a carrier frequency, $f_c$, in the range 3–10 KHz.

The bypass circuit according to the invention includes three capacitors 24–26, of equal capacitance, each having one terminal or side connected to a different one of the lines 16. The capacitors have their other terminals connected together at a node to form a wye configuration. The capacitance of the parallel combination of capacitors 24–26 is designated C1.

A single phase transformer 28 has its primary winding connected between the node of the wye configuration of capacitors 24–26 and neutral 17. The secondary of transformer 28 has one terminal connected to neutral 21. A capacitor with capacitance C2 is connected between the other terminal of the secondary of transformer 28 and the node of the wye windings of transformer 12. A neutral grounding reactor with inductance L is connected from the node of the wye transformer windings 18 to neutral 21.

To reduce the coupling impedance of the circuit of FIG. 1 and to maximize the signal level transmitted in both directions, the values of the circuit reactances are selected so that a series resonant circuit is formed by inductance L, capacitance C2, the self inductance of transformer 28, and the capacitance C1 of capacitors 24–26. The circuit is made resonant at the signal carrier frequency $f_c$.

The component values for resonance can be computed as follows. The primary-to-secondary voltage ratio of transformer 28 will be designated Rps. The capacitance of capacitors 24–26 considered in parallel and referred to the secondary circuit of transformer 28 will be designated C1S, given by: C1S=(Rps)²C1. The series combination of C1S and C2 is the series resonating capacitance Cr:

Cr=(C1S) (C2)/(C1S+C2).

The self inductance Lps of transformer 28, referred to the secondary of this transformer, is that inductance, preferably measured at or near $f_c$, seen looking into the secondary of transformer 28 with the primary shorted. Then, for resonance at $f_c$:

$(2\pi f_c)^2 = 1/(Cr(L+Lps))$.

In order that the ratio of the signal voltage on the lines 16 to that on lines 20 be the same as the ratio R of the power voltages on lines 16 to the power voltages on lines 20, the voltage ratio Rps is made equal to R. With this value, signal voltages bypassing the transformer in either direction experience very nearly the same transformation as if they had passed through the transformer. A customer distribution transformer which would transform the voltage on lines 16 down to 120 volts, would transform the communication signal by the same degree down to some particular range of voltages. A second customer distribution transformer on the other side of transformer 12, which would provide a 120-volt customer voltage from lines 20 would transform the communications signal down to the same voltage range as at the output of the first customer distribution transformer, since the signal voltage ratio of the bypass circuit equals the voltage ratio of the power transformer. It is of apparent utility to have the communications signals appearing at various customer sites be in the same voltage range, so that the power line communications equipment can be standardized. For this reason, it is important that the bypass circuit exhibit the same voltage ratio as the power voltage ratio of transformer 12.

Although the self inductance Lps of transformer 28 is important in establishing the condition of series resonance of the bypass circuit, it is ordinarily not significant in establishing the condition wherein the signal voltage transformation is equal to the transformation of power voltage. With this simplifying assumption, the voltage ratio Rps of the transformer 28 can be made equal to the voltage ratio R of the transformer 12.

However, for the rigorous case, or where the self inductance Lps of transformer 28 cannot be considered insignificant in respect to its effect on signal voltage ratio, the relationship between Rps and R is adjusted as follows:

$$Rps \left( \frac{Lps + L}{L} \right) = R$$

The impedance of the neutral grounding reactor L is conventionally coordinated with the characteristics of delta-wye transformer 12 to equalize phase-to-neutral power fault currents with those of phase-to-phase faults, and/or otherwise coordinated with fault protection considerations and equipment associated with transformer 12.

The single phase transformer 28 provides isolation between the two neutrals 17 and 21. As indicated in FIG. 1 by jumper 30, there may be one neutral common to three phase lines 16 and 20. Where isolation between the neutrals is not required, single phase transformer 28 can alternaively be a tapped single-winding autotransformer.

I claim:

1. A circuit for bidirectionally bypassing a delta-wye transformer, having a primary-to-secondary voltage ratio R, with a communication signal having a carrier frequency, which signal is to be transmitted as a balanced phase-to-neutral signal on first three phase lines and neutral on the delta windings side of the transformer and on second three phase lines and neutral on the wye windings side thereof, comprising:

a set of three capacitors, each having one side thereof connected at a node to form a wye configuration, and each having the other side connected to a different one of the lines on the delta side of the delta-wye transformer;

a single phase transformer with a primary winding connected between the node of the wye configuration of capacitors and said first neutral, and having a secondary winding with a first terminal thereof connected to said second neutral;

another capacitor with capacitance C2 having one terminal thereof connected to the node of the wye windings of the delta-wye transformer and the other terminal thereof connected to a second terminal of the secondary winding of the single phase transformer; and an inductive reactor with inductance L connected between the node of the wye windings of the delta-wye transformer and said second neutral.

2. The circuit of claim 1, wherein the series combination including the inductance L, capacitance C2, the self inductance of the single phase transformer, and the capacitance of the wye configured capacitors considered in parallel is substantially resonant at said carrier frequency.

3. The circuit of claim 1, wherein the primary-to-secondary voltage ratio of the single phase transformer is approximately equal to R.

4. The circuit of claim 1, wherein said terminal of the secondary of the single phase transformer connected to said second neutral is additionally electrically connected to said first neutral.

5. The circuit of claim 4, wherein said single phase transformer is an autotransformer.

6. The circuit of claim 1, wherein the primary-to-secondary voltage ratio Rps of the single phase transformer is approximately equal to $(R)(L)/(L_{ps}+L)$.

* * * * *